(12) United States Patent  (10) Patent No.: US 6,703,817 B2
Cohen  (45) Date of Patent: Mar. 9, 2004

(54) PULSE WIDTH MODULATED POWER CONVERSION APPARATUS AND METHODS USING CAPACITOR-CHARGE FEEDBACK

(75) Inventor: Isaac Cohen, Dix Hills, NY (US)

(73) Assignee: Lambda Electronics, Inc., Plainview, NY (US)

( * ) Notice: Subject to any disclaimer, the term of this patent is extended or adjusted under 35 U.S.C. 154(b) by 24 days.

(21) Appl. No.: 10/093,269

(22) Filed: Mar. 7, 2002

(65) Prior Publication Data

US 2003/0169028 A1 Sep. 11, 2003

(51) Int. Cl.$^7$ .............................. G05F 1/40; H02M 3/335
(52) U.S. Cl. ............................................ 323/282; 363/17
(58) Field of Search ................................. 323/288, 286, 323/287, 282, 283, 284; 363/16, 17, 132, 127, 44, 89, 90

(56) References Cited

U.S. PATENT DOCUMENTS

| | | | |
|---|---|---|---|
| 4,591,963 A | * 5/1986 | Retotar | 363/17 |
| 5,173,847 A | * 12/1992 | Suzuki | 363/80 |
| 6,130,828 A | 10/2000 | Rozman | |
| 6,222,747 B1 | 4/2001 | Rinne et al. | |
| 6,243,275 B1 | 6/2001 | Ferencz | |
| 6,373,727 B1 | 4/2002 | Hedenskog et al. | |

OTHER PUBLICATIONS

Unitrode, Current Mode PWM Controller, UC1842/3/4/5, UC2842/3/4/5, UC3842/3/4/5, 1999, 8 pages, no date.

Unitrode Application Note, UC3842/3/4/5 Provides Low-Cost Current-Mode Control, U-100A, pp. 3-53 through 3-66, 1999, no date.

Balough, Design Review: 100W, 400kHz, DC/DC Converter With Current Doubler Synchronous Rectification Achieves 92% Efficiency, Unitrode Power Supply Design Seminar, 1996, pp. 2-1 through 2-25, no date.

* cited by examiner

Primary Examiner—Rajnikant B. Patel
(74) Attorney, Agent, or Firm—Myers Bigel Sibley & Sajovec

(57) ABSTRACT

A power converter apparatus includes a transformer having a primary winding and a secondary winding, a switching circuit operative to couple and decouple the primary winding of the transformer to a power source, and a control circuit that controls the switching circuit. A feedback circuit is coupled to the output port of a power transfer network and to the control circuit. The feedback circuit generates a current responsive to an output voltage at an output port of a power transfer network, charges a capacitance responsive to the generated current, and intermittently discharges the capacitance responsive to a control signal generated by the control circuit. A modulator circuit is coupled to the feedback circuit and to the power transfer network, and selectively couples the secondary winding of the transformer to an input port of the power transfer network responsive to a voltage on the capacitance. The invention may be embodied as apparatus or methods.

31 Claims, 9 Drawing Sheets

PULSE WIDTH MODULATED POWER CONVERSION APPARATUS AND METHODS USING CAPACITOR-CHARGE FEEDBACK

BACKGROUND OF THE INVENTION

The present invention relates to power conversion apparatus and methods, and more particularly, to pulse width modulator (PWM) power conversion apparatus and methods.

Pulse width modulation is commonly used in switching-type power converters, such as DC power supplies and DC-DC converters. In a typical PWM converter, a control circuit implements power conversion cycles wherein a power source intermittently transfers power to a power transfer network, e.g., an LC filter network, transformer, or the like, for durations that are varied responsive to, for example, an output voltage produced by an output of the power transfer network.

Control of pulse duration in a PWM converter may be accomplished in a number of different ways. Referring to FIG. 1, a control circuit for a conventional PWM converter includes a charging circuit 1 that quickly charges a capacitor 4 responsive to first and second synchronization signals SYNC1, SYNC2. The capacitor 4 is discharged by a current mirror circuit 3 responsive to an output of an amplifier circuit 2. In particular, the amplifier circuit 2 generates a signal that controls the current mirror circuit 3, with the signal representing a difference between and output voltage produced by the PWM circuit and a reference voltage VREF.

The voltage on the charged capacitor 4 is reduced by the current mirror circuit 3 at a rate proportional to the magnitude of the signal produced by the amplifier circuit 2. A voltage responsively produced at an emitter terminal of a transistor 5 is applied to a control input RT/CT of a Unitrode 3843N Current Mode PWM Controller integrated circuit 6. The PWM controller integrated circuit 6 provides a drive signal DRV that has a duty cycle that varies responsive to the voltage applied at the control input RT/CT. This pulse width modulated drive signal DRV may be used, for example, to drive the input switching transistor of a forward converter, or similar switching devices in buck regulator, boost regulator, or other PWM applications.

Other techniques have also been proposed. For example, U.S. Pat. No. 6,130,828 to Rozman describes a DC-DC converter including a transformer having a primary winding connected to an input circuit and a secondary winding connected to an output channel. An amplifier and an integrator circuit are coupled to the output channel and control a switch that is coupled to the secondary winding. A diode coupled between the secondary winding and the integrator circuit resets the integrator circuit. U.S. Pat. No. 6,222,747 to Rinne et al. describes generating a pulse width modulated transistor drive signal responsive to a comparison of a voltage error signal to a sawtooth reference waveform.

SUMMARY OF THE INVENTION

According to some embodiments of the invention, a power converter apparatus includes a transformer having a primary winding and a secondary winding, a switching circuit operative to couple and decouple the primary winding of the transformer to a power source, and a control circuit that controls the switching circuit. A feedback circuit is coupled to the output port of a power transfer network and to the control circuit. The feedback circuit generates a current responsive to an output voltage at an output port of a power transfer network, charges a capacitance responsive to the generated current, and intermittently discharges the capacitance responsive to a control signal generated by the control circuit. A modulator circuit is coupled to the feedback circuit and to the power transfer network, and selectively couples the secondary winding of the transformer to the power transfer network responsive to a voltage on the capacitance.

In some embodiments of the invention, the feedback circuit includes an amplifier circuit that generates the current responsive to comparison of the output voltage to a reference. For example, the amplifier circuit may include a transconductance amplifier circuit that generates the current proportional to a difference between a reference voltage and a voltage representative of the output voltage.

In further embodiments, the feedback circuit is further operative to generate a second current responsive to an output current derived from the output port to charge the capacitance responsive to the second current. For example, the feedback circuit may further include an amplifier circuit, e.g., a second transconductance amplifier circuit, that generates the second current responsive to a comparison of the output current to a reference.

According to still further embodiments, the switching circuit includes a first switching circuit, and the modulator circuit includes a comparator circuit that generates a switch control signal responsive to a comparison of the voltage on the capacitance and a threshold voltage and a second switching circuit that selectively couples the secondary winding to the power transfer network responsive to the switch control signal. The apparatus may further include a feedforward circuit that generates the threshold voltage responsive to a voltage applied to the primary winding of the transformer. In yet further embodiments, the switch control signal includes a first switch control signal, and the second switching circuit includes a first switch that operates responsive to a second switch control signal, a second switch that operative responsive to a third switch control signal, and a complementary driving circuit that generates the second and third switch control signals responsive to the first switch control signal such that the first and second switches operate in a substantially complementary fashion. The complementary driving circuit may include a monostable driving circuit that generates the third switch control signal.

The present invention may provide several advantages over conventional PWM converter apparatus. For example, according to some embodiments of the invention, the charging current may monotonically charge a capacitor to generate a comparator input, such that improved noise immunity can be provided in comparison to PWM control circuits that compare a voltage feedback signal to a fixed-slope ramp circuit. In some embodiments, synchronized operation of primary and secondary side modulators can be achieved in a relatively simple fashion by triggering operation of the secondary side modulator using a control signal generated by control circuit that controls the primary side modulator. Such an approach can also provide with additional noise immunity. The invention may be embodied as apparatus or methods.

DETAILED DESCRIPTION

Figure 1:
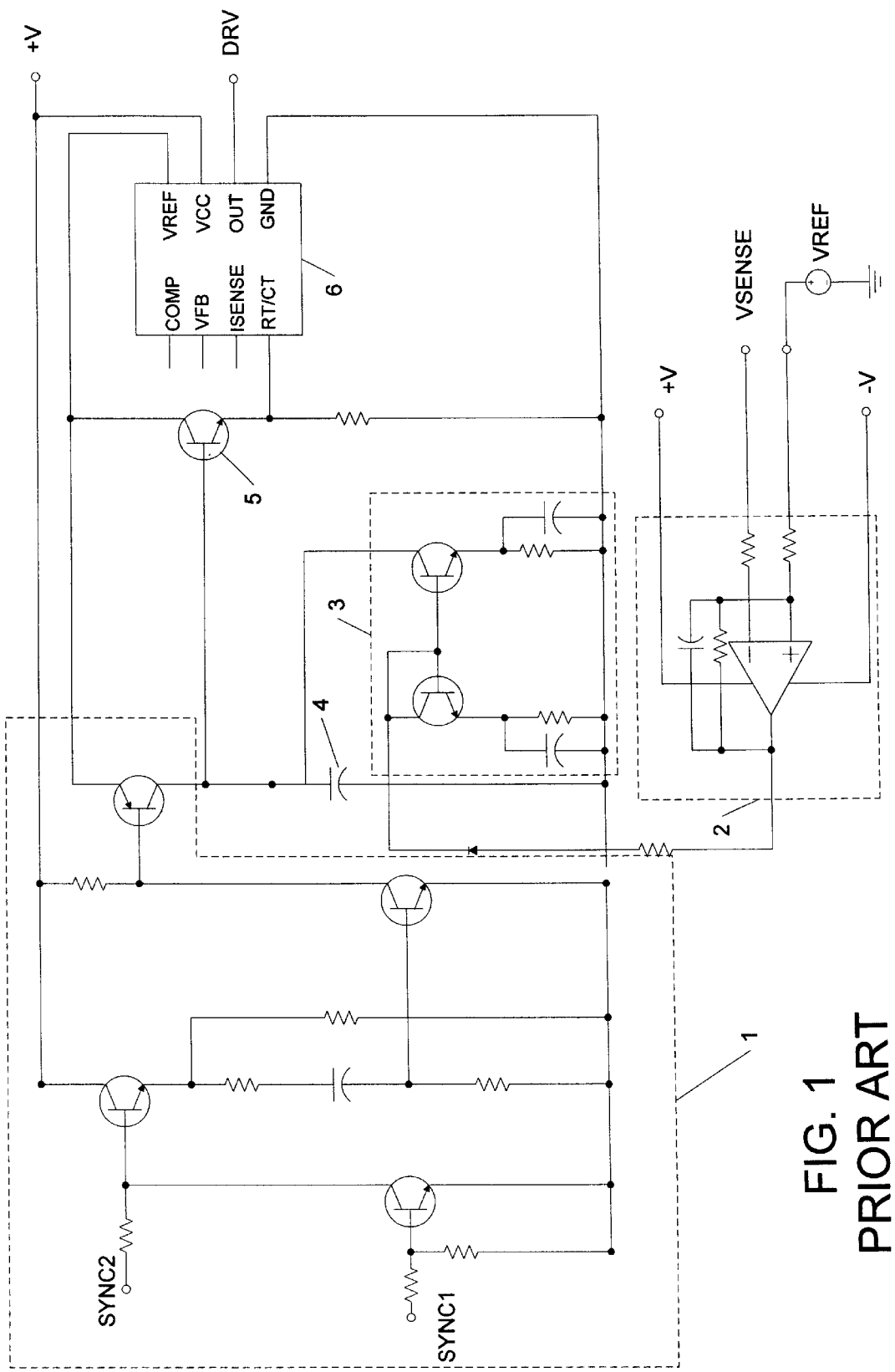
FIG. 1 is a schematic diagram illustrating a conventional PWM control circuit.

Specific embodiments of the invention now will be described more fully with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

Figure 2:
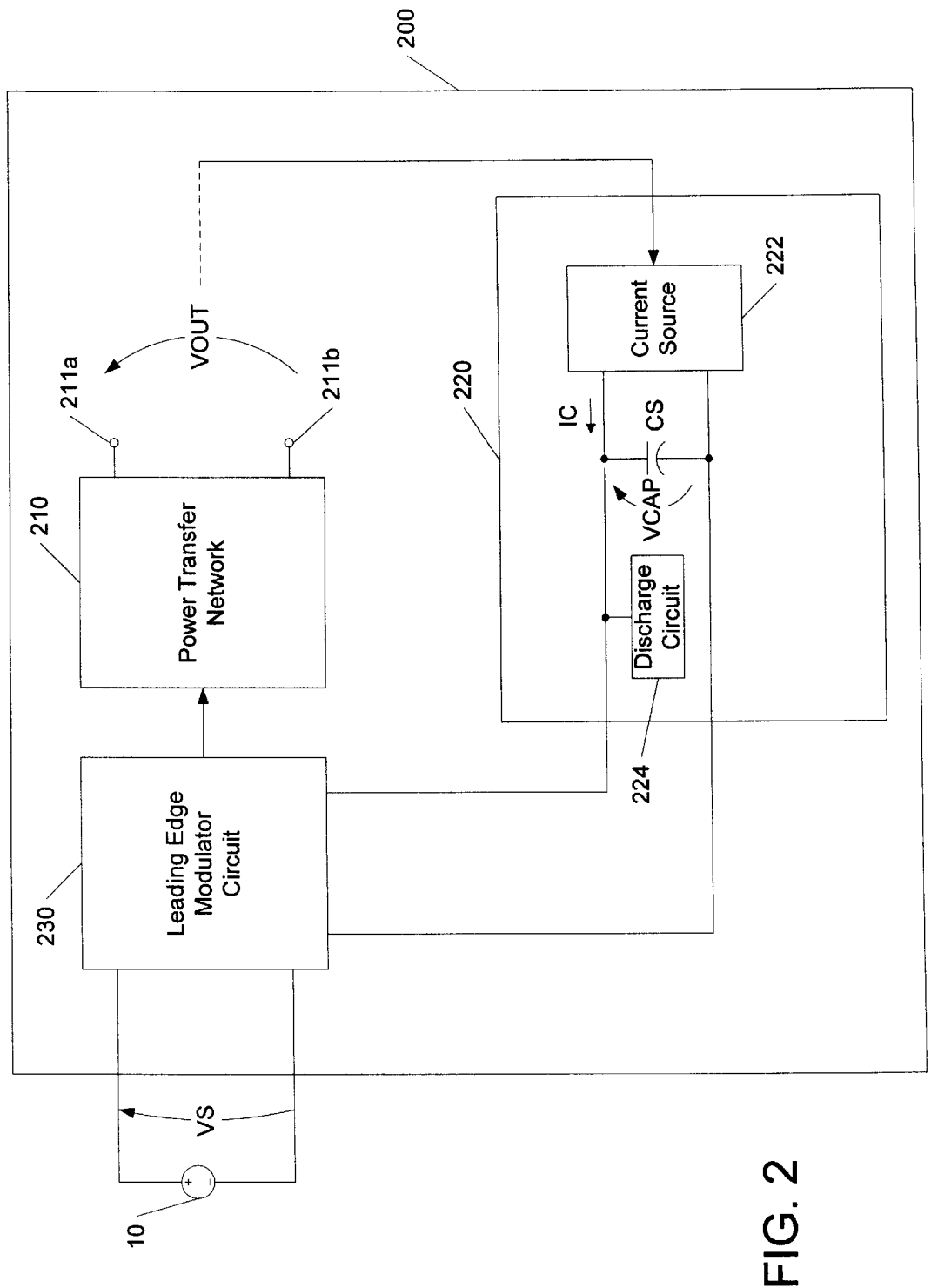
FIG. 2 is a schematic diagram illustrating a power converter apparatus according to embodiments of the invention.

FIG. 2 conceptually illustrates a power converter apparatus 200 according to embodiments of the invention. The apparatus 200 includes a power transfer network 210 that, as explained below, may take any of a variety of forms. The apparatus 200 further includes a modulator circuit 230 operative to selectively apply power from a power source 10 to the power transfer network 210 responsive to voltage VCAP generated on a capacitance, here shown as a capacitor CS of a feedback circuit 220. The feedback circuit 220 includes a current source 222 that generates a current IC responsive to a voltage VOUT at an output port 211a, 211b of the power transfer network 210. The current IC charges the capacitor CS to develop the voltage VCAP that controls the modulator circuit 230. A discharge circuit 224 is operative to intermittently discharge the capacitor CS.

It will be appreciated that the invention is applicable to any of a wide variety of switching power converter applications. For example, as described below, the invention may be used in isolated and non-isolated buck regulator and boost regulator regulators, in primary regulator applications such as clamped converters, and in other pulse-width modulator (PWM) converter applications. As also described below, the invention may further include current feedback and/or voltage feedforward control to provide enhanced performance.

Figure 3:
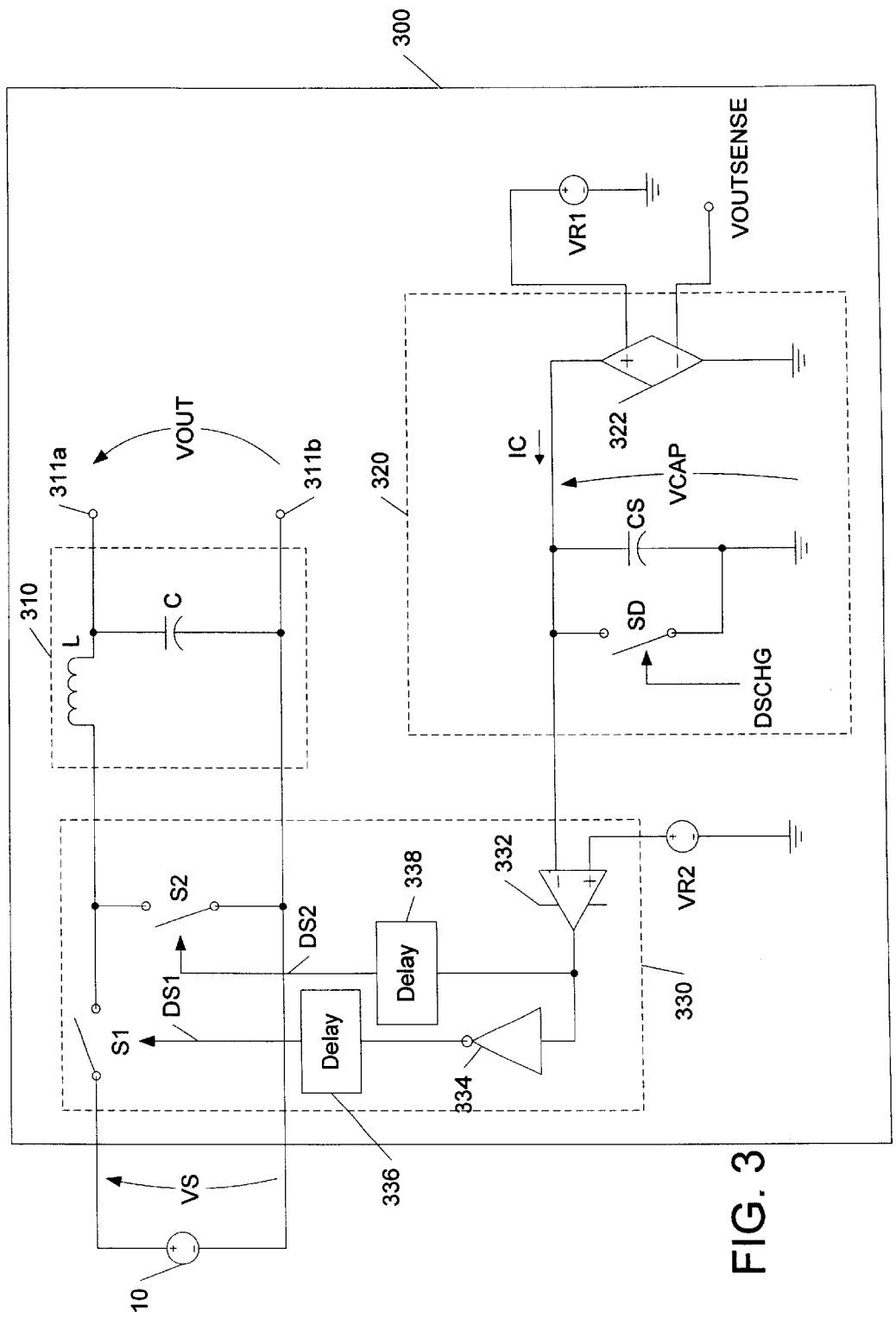
FIG. 3 is a schematic diagram illustrating a power converter apparatus according to further embodiments of the invention.

An exemplary power converter apparatus 300 according to further embodiments of the invention is illustrated in FIG. 3. The apparatus 300 includes a power transfer network 310 that includes an inductor L and a capacitor C. A modulator circuit 330 selectively couples a voltage source 10 to the power transfer network 310 responsive to voltage VCAP on a capacitor CS of a feedback circuit 320. The feedback circuit 320 generates the voltage VCAP responsive to a sense voltage VOUTSENSE derived from a voltage VOUT at an output port 311a, 311b of the network 310.

In greater detail, the feedback circuit 320 includes a transconductance amplifier 322 the generates the current IC that charges the capacitor CS. The transconductance amplifier 322 may include any of a number of different circuits known to those skilled in the art, and will not be described in further detail herein. The transconductance amplifier 322 generates a current IC proportional to a difference between the voltage VOUTSENSE and a reference voltage VR1 such that the current IC represents a difference between the voltage sense voltage VOUTSENSE and the reference voltage VR1. The current IC charges the capacitor CS to generate the voltage VCAP. The capacitor CS is discharged by a switch SD responsive to a discharge control signal DSCHRG, which may be periodic clock signal, as described below with reference to FIG. 4. The discharge switch SD may include any of a number of different switching devices including, but not limited to, transistors and other solid state switching devices.

The modulator circuit 330 includes a comparator 332 that generates a control signal used to control first and second switches S1, S2 in a substantially complementary manner responsive to a comparison of the capacitor voltage VCAP and a reference voltage VR2. In particular, the comparator 332 controls the first switch S1 by generating a first switch control signal DS1 via an inverter 334 and a turn-on delay 336, and controls the second switch S2 by generating a second switch control signal DS2 via a second turn-on delay 338. The turn-on delays 336, 338 provide sufficient delay between turning off one of the switches S1, S2 and turning on the other of the switches S1, S2 to reduce or avoid cross-conduction of the switches S1, S2. The switches S1, S2 may include any of a number of different types of switching devices, including but not limited to, solid state switching devices, such as metal oxide semiconductor field effect transistors (MOSFETs).

Figure 4:
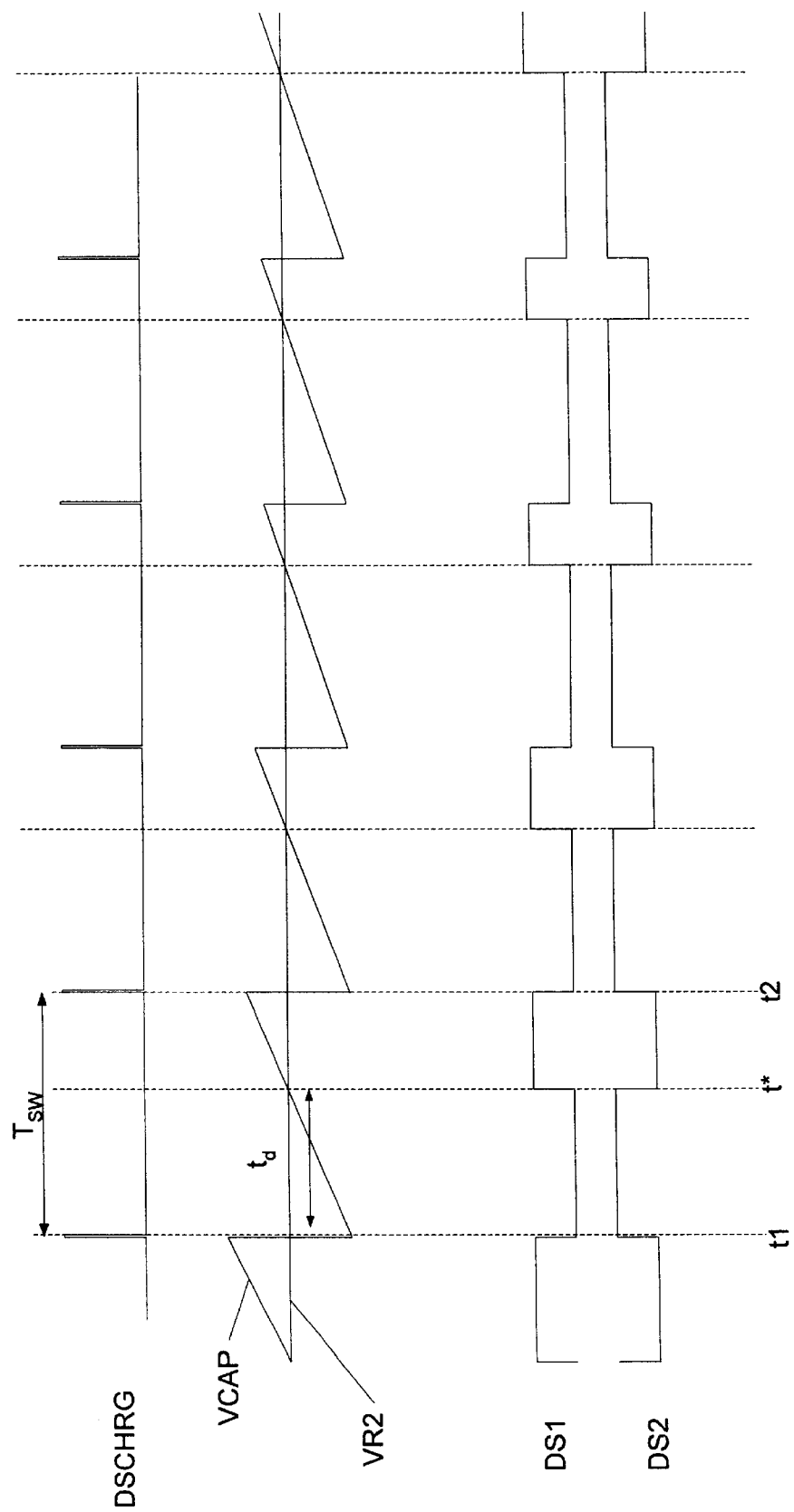
FIG. 4 is a waveform diagram illustrating exemplary operations of the power converter apparatus of FIG. 3.

Exemplary operations of the apparatus 320 will now be described with reference to the timing diagram of FIG. 4. As shown in FIG. 4, the discharge signal DSCHRG applied to the discharge switch SD is a periodically-pulsed signal with a period $T_{SW}$. A "high" pulse of the discharge signal DSCHRG causes the switch SD to close and thereby discharge the capacitor CS. The pulse in the discharge signal DSCHRG causes the switch drive signals DS1, DS2 to go to respective "low" and "high" levels, such that the switches S1, S2 are "off" and "on," respectively. For simplicity of illustration, turn-on delays of the switches S1, S2 are ignored in FIG. 4. The width of the pulse in the discharge signal DSCHRG as illustrated in FIG. 4 is representative, and may vary within the scope of the invention.

When the DSCHRG signal again goes "low" at time t1, the charging current IC generated by the transconductance amplifier 322 begins to charge the capacitor CS and, thus, causes the capacitor voltage VCAP to rise. For purposes of simplicity of presentation, the charging process is shown as approximately linear in FIG. 4, which generally corresponds to the current IC remaining approximately constant during the charging interval t1 to t2. However, it will be appreciated that the rate of change of the voltage VCAP is generally dependent upon the level of the current IC, which is, in turn, dependent upon the difference between the voltage VOUTSENSE and the reference voltage VR1. Therefore, the rate of change of the voltage VCAP during charging intervals, such as the interval t1 to t2, may generally be non-linear due to, for example, fluctuations in the voltage VOUTSENSE arising from fluctuations in the output voltage VOUT.

At a time t*, the capacitor voltage VCAP exceeds the reference voltage VR2. This causes the comparator 332 to change the states of the switches S1, S2 such that they are "on" and "off," respectively. This begins a power transfer or "conduction" phase of the cyclical operation of the apparatus 300, as current begins to flow from the power source 10 to the power transfer network 310. This conduction phase ends at time t2, when the discharge control signal DSCHRG again goes "high," closing the switch SD and discharging the capacitor CS. This causes the comparator 332 to toggle the switches S1, S2 to respective "off" and "on" states, with the delay 336 providing a delay in turning on the second switch S2 after opening of the first switch S1 sufficient to prevent cross-conduction. It will be appreciated that the length of the "on" interval of the switch S1 and, thus, the length of the conduction phase of the converter cycle, is controlled by the rate of change of the voltage VCAP, which controls the time $t_d$ before the beginning of the conduction phase (e.g., t*).

In particular, the operation illustrated in FIG. 4 can be characterized as "leading edge" modulation, i.e., the leading edge or initiation of the conduction phase (as indicated by the switch control signal DS1 in FIGS. 3 and 4) is modulated responsive to the feedback, for example, the capacitor voltage VCAP generated responsive to the voltage sense signal VOUTSENSE. This contrasts with so-called "trailing edge" modulation, in which the leading edge or initiation of a conduction phase coincides with a clock signal transition and the trailing edge, i.e., the termination, of the conduction phase is modulated responsive to, for example, a voltage feedback signal.

The invention can be particularly advantageous in leading edge modulation applications. For example, in a trailing edge modulation application in which the connections to the transconductance amplifier 322 are reversed and the drive signals DS1, DS2 inverted in comparison to the configuration and operations illustrated in FIGS. 3 and 4, limits on the speed at which the feedback capacitor CS can be charged can effectively limit the minimum duty cycle at which the switch S1 can be operated to be greater than zero, such that switch S1 is constrained to be "on" for a significant time during each conversion cycle. Such constraints can cause undesirable gain characteristics under light loading conditions. In contrast, in the leading edge modulation configuration and operations illustrated in FIGS. 3 and 4, the duty cycle of the switch S1 can go to zero, i.e., the current IC can be sufficiently low to prevent the capacitor voltage VCAP from exceeding the threshold voltage VR2 before the discharge of the capacitor CS by the discharge signal DSCHRG, such that the switch control signal DS1 does not go "high" during a given cycle. In such leading edge operations, constraints on the rate at which the capacitor CS can be charged can limit the maximum duty cycle at which the switch S1 can be operated, which may be more acceptable and/or desirable than a limit on minimum duty cycle.

The transconductance amplifier 322 preferably operates to maintain a positive current IC (in the sense indicated by the arrow in FIG. 3), such that the voltage VCAP monotonically increases during each charging interval (e.g., t1 to t2). This can provide improved noise immunity over, for example, conventional designs that use a comparator that compares a typically fluctuating, non-monotonic voltage error signal to a fixed-slope ramp reference signal, and which can exhibit oscillation or other false triggering. In embodiments of the invention, noise immunity can be even further improved by providing hysteresis in the comparator 332.

Figure 5:
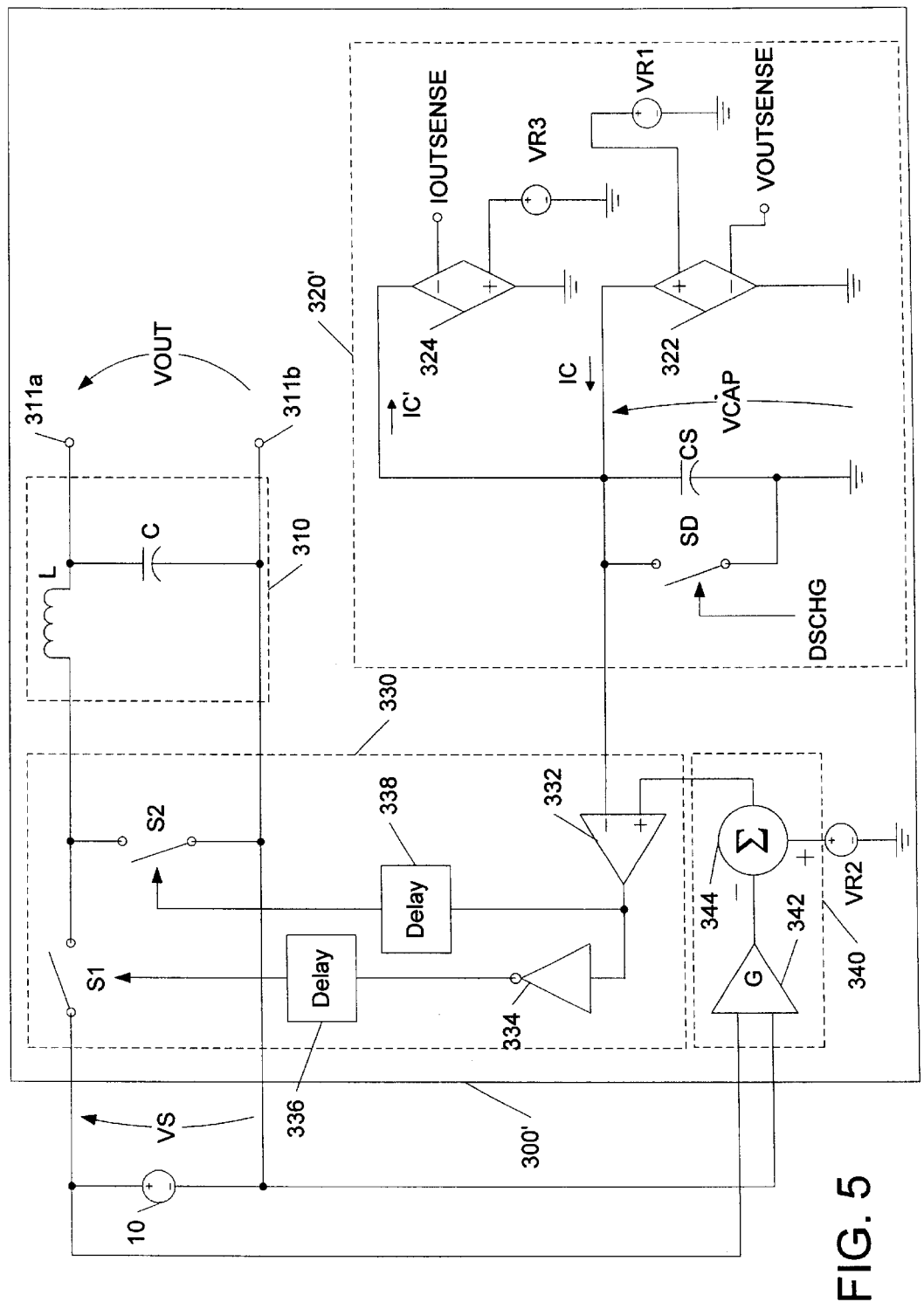
FIG. 5 is a schematic diagram illustrating a power converter apparatus with feedforward compensation and current feedback according to other embodiments of the invention.

In a power converter apparatus 300' according to embodiments of the invention illustrated in FIG. 5, a current feedback function may be added. The apparatus 300' includes many of the same components of the apparatus 300 of FIG. 3, with like components indicated by like reference numerals. Further discussion of these components will be omitted in light of the foregoing discussion of FIG. 3.

The power converter apparatus 300' differs from the apparatus 300 in that it further includes a feedback circuit 320' that has second transconductance amplifier 324 that receives a voltage IOUTSENSE that is indicative of an output current derived from the output port 311a, 311b of the power transfer network 310. The second transconductance amplifier 324 generates a current IC' proportional to a difference between the voltage IOUTSENSE and a reference voltage VR3. In particular, the second transconductance amplifier 324 may be configured to reduce the rate of charging of the capacitor CS as the output current increases. Thus, the second transconductance amplifier 324 can reduce the "on" time of the first switch S1 and increase the "off" time of the second switch S2 responsive to an overcurrent condition.

Figure 6:
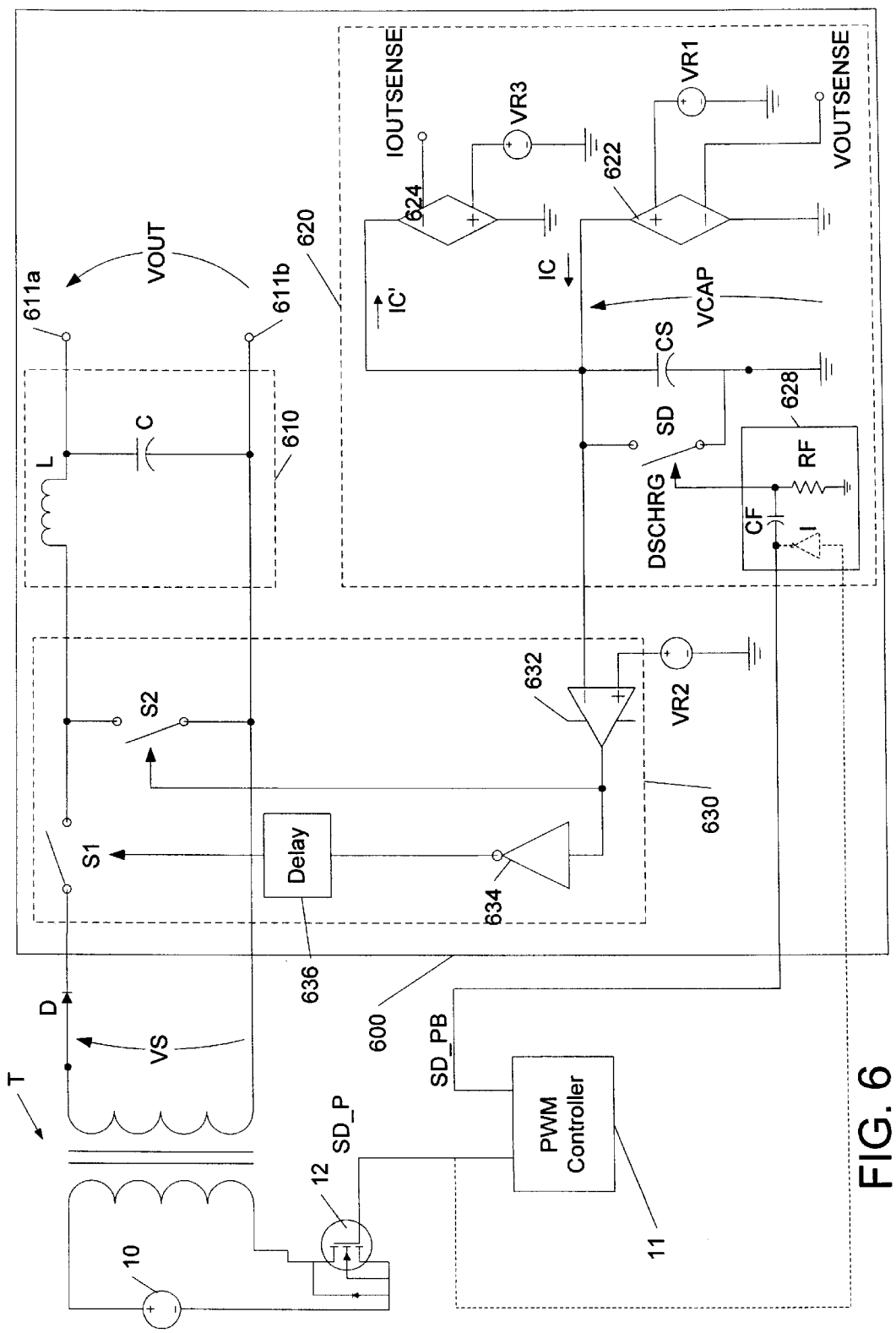
FIG. 6 is a schematic diagram illustrating a secondary regulator apparatus according to still other embodiments of the invention.

FIG. 6 illustrates a power converter apparatus according to further embodiments of the invention. In particular, FIG. 6 illustrates a secondary regulator apparatus 600 for regulating an output voltage VOUT produced from a voltage VS produced at a secondary winding of a transformer T that has its primary controlled by a pulse width modulator circuit including a transistor 12 and a PWM controller 11 that generates a switch control signal SD_P that controls the primary transistor 12. The apparatus 600 includes a power transfer network 610 including an inductor L and a capacitor C, coupled to the secondary winding of the transformer T by a rectifying diode D. A modulator circuit 630 includes first and second switches S1, S2 that selectively couple the secondary of the transformer T to the power transfer network 610 responsive to voltage VCAP on a capacitor CS of a feedback circuit 620. It may be noted that the diode D may be a separate rectifying diode (e.g., in the case in which the first switch S1 is a MOSFET with a body diode that cannot block reverse voltage) or may be integrated with the switch S1.

The feedback circuit 620 generates the voltage VCAP responsive to a voltage VOUTSENSE derived from a voltage VOUT at an output port 611a, 611b of the power transfer network 610. The feedback circuit 620 includes a transconductance amplifier 622 that generates a current IC proportional to a difference between the voltage VOUTSENSE and a reference voltage VR1. The current IC charges the capacitor CS to generate the voltage VCAP. The capacitor CS is discharged by a switch SD responsive to a discharge control signal DSCHRG generated by a discharge control circuit 628.

The discharge control circuit 628 generates the discharge control signal DSCHRG responsive to the PWM controller 11. For example, in the leading edge modulator application illustrated, the discharge control circuit 628 may include a filter circuit including a capacitor CF and a resistor RF, and the discharge control signal DSCHRG may be generated responsive to a signal SD_PB that is complementary to the switch control signal SD_P. Alternatively, the filter circuit CF, RF may be driven by the switch control signal SD_P using an inverter I. It will be understood that the degree of coincidence of the falling edge of the voltage VS and the closing of the discharge switch SD need not be substantially great. It will be understood that other configurations for the discharge circuit 628 may also be used with the invention.

Generating the discharge control signal DSCHRG from a control signal generated by the primary side PWM controller 11 can provide several advantages. For example, generating the discharge control signal DSCHRG in such a manner can provide a high degree of synchronization between the operation of the switches S1, S2 and the operation of the primary switching transistor 12. Furthermore, in contrast to, for example, a discharge control signal generated directly from the secondary voltage VS that may, for example, exhibit transients when the switches S1, S2 operate, the discharge control signal DSCHRG generated from a primary side control signal may be less susceptible to noise or transients that could cause inadvertent discharge of the capacitor CS.

The feedback circuit 620 also includes a second transconductance amplifier 624 that receives a voltage IOUTSENSE that is indicative of an output current derived from the output port 611a, 611b of the power transfer network 610. The second transconductance amplifier 624 generates a current IC' proportional to a difference between the voltage IOUTSENSE and a reference voltage VR3. In particular, the second transconductance amplifier 624 may be configured to reduce the rate of charging of the capacitor CS as the output current increases. In this manner, the second transconductance amplifier 624 can reduce the "on" time of the first switch S1 and increase the "off" time of the second switch S2 under overcurrent conditions.

The modulator circuit 630 includes a comparator 632 that generates a control signal used to control first and second switches S1, S2 in a substantially complementary manner responsive to a comparison of the capacitor voltage VCAP and a reference voltage VR2. In particular, the comparator 632 controls the first switch S1 via an inverter 634 and a turn-on delay 636 and directly controls the second switch S2. The first switch S1 can be operated with natural commutation at turn off, i.e., the current may be reduced to substantially zero as a result of turn-off of the primary transistor 12, such that a delay in closing the second switch S2 may be unnecessary.

According to further aspects of the invention, improved performance for a power converter apparatus may be achieved using feedforward compensation. Referring back to FIGS. 3 and 4, the output voltage VOUT of the power converter apparatus 300 may be expressed as:

$$VOUT = VS\left(1 - \frac{t_d}{T_{SW}}\right), \quad (1)$$

where $t_d$ is the time interval from the time the capacitor CS is discharged to the time the first switch S1 begins conduction and $T_{SW}$ is the period of operation of the switches S1, S2. Assuming that the current IC is limited to a maximum value ICMAX, the value of the time interval $t_d$ may be given by:

$$t_d = \frac{C \cdot VR2}{ICMAX}, \quad (2)$$

where C is the capacitance of the capacitor CS. Substituting equation (2) into equation (1) yields:

$$VOUT = VS\left(1 - VR2 \cdot \frac{C}{ICMAX \cdot T_{SW}}\right) - \frac{(VOUT - VS)}{VS \cdot C} \cdot ICMAX \cdot T_{SW}. \quad (3)$$

The output voltage VOUT may be made substantially independent of the input voltage VS by varying the threshold voltage VR2 appropriately with the input voltage VS. For an ideal feedforward situation, the threshold voltage VR2 may be given by:

$$VR2(VS) = \left(1 - \frac{VOUT}{VS}\right) \cdot \frac{ICMAX \cdot T_{SW}}{C}. \quad (4)$$

Figure 7:
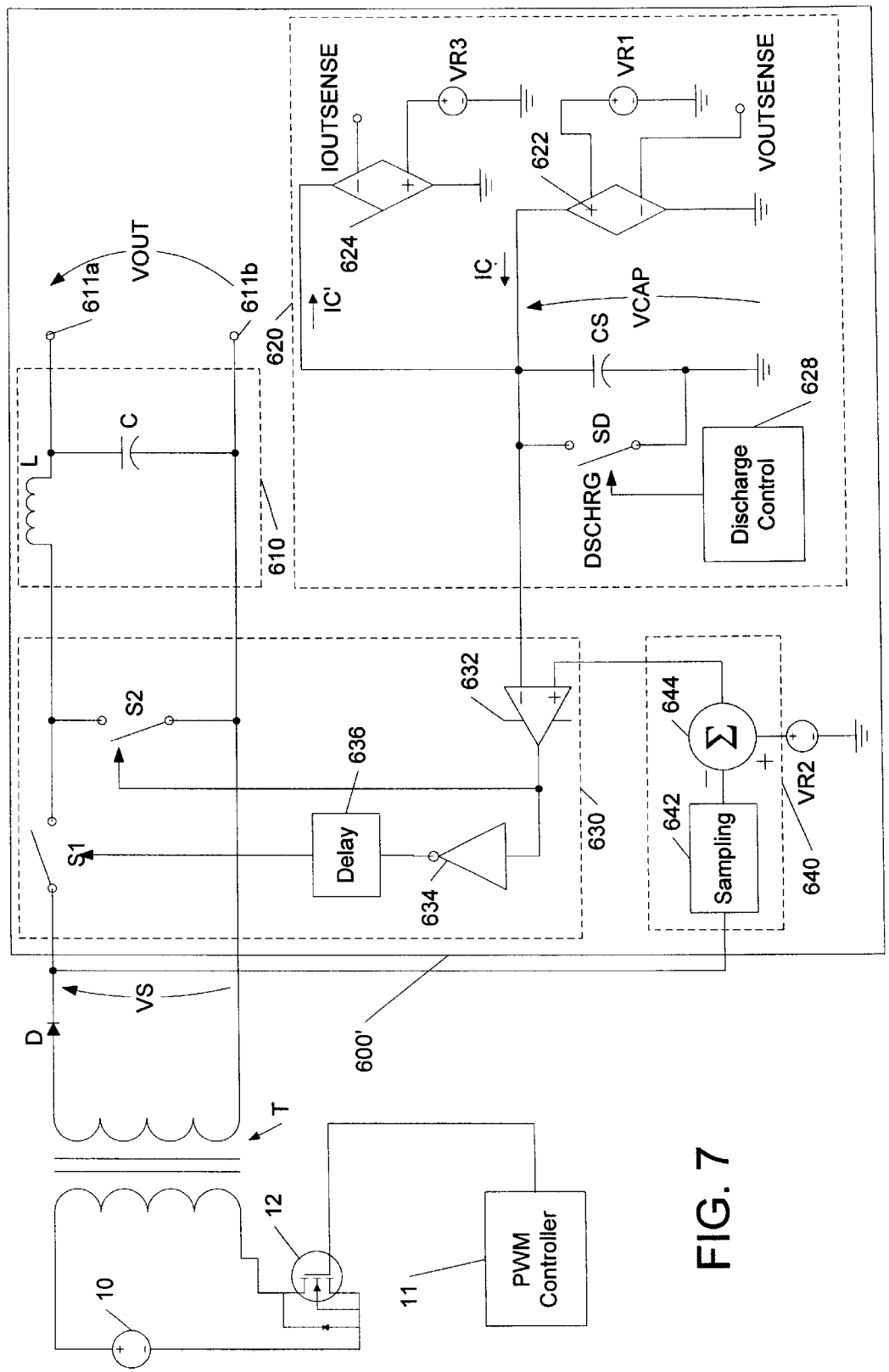
FIG. 7 is a schematic diagram illustrating a secondary regulator apparatus with feedforward compensation according to other embodiments of the invention.

As illustrated in FIG. 7, a power converter apparatus, such as the secondary buck regulator apparatus 600 of FIG. 6, may be improved by adding feedforward compensation. In particular, the power converter apparatus 600' according to embodiments of the invention illustrated in FIG. 6 includes like components to those of the apparatus 600 of FIG. 6, as indicated by like reference numerals. The power converter apparatus 600' further includes a feedforward circuit 640 that subtracts a scaled version of the input voltage VS from a reference voltage VR2, and applies the resultant feedforward compensated threshold signal V* to the comparator 632 of the modulator circuit 630. The feedforward circuit 640 includes a sampling and scaling circuit 642 that produces the voltage that is subtracted from the reference voltage VR2 at a summing circuit 644. In operation, the feedforward circuit 640 acts to maintain the open loop gain of the apparatus 600' approximately constant as the input voltage VS varies. This can be advantageous, as variation of the open-loop gain may hamper rejection of input ripple and may hinder compensation of the control loop.

It will be appreciated that the apparatus 600' of FIG. 7 implements a linear approximation of the function of equation (4):

$$V^* = VR2 - B \cdot VS, \quad (5)$$

where B is the scaling provided by the sampling and scaling circuit 642. It will be appreciated that other feedforward configurations may be used with the invention, including feedforward circuits that more closely approach the ideal behavior described by equation (4), including circuits that provide higher-order approximations than the circuitry illustrated in FIG. 7.

Figure 8:
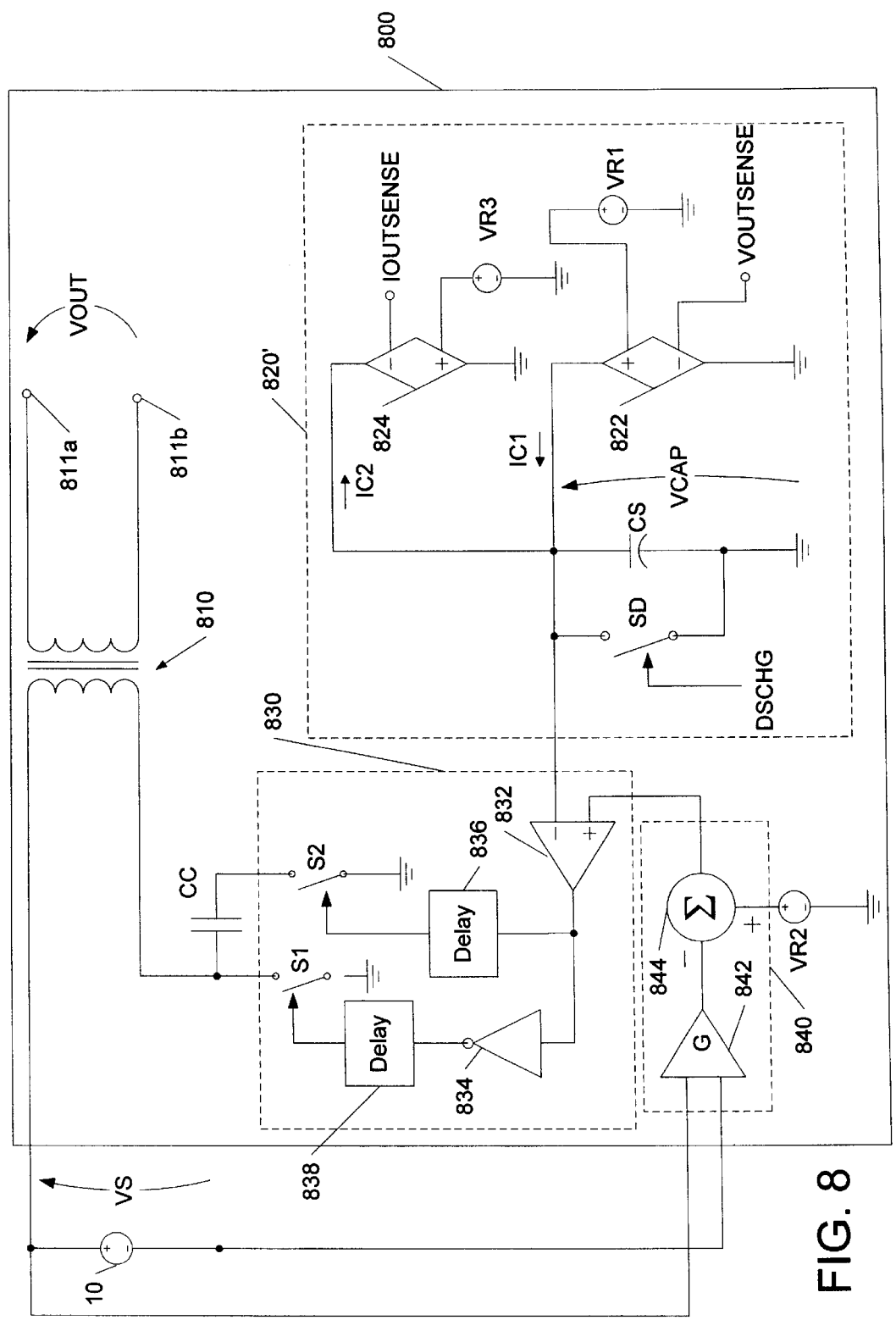
FIG. 8 is a schematic diagram illustrating a power converter apparatus according to further embodiments of the invention.

It will be appreciated that the invention may used in any of a variety of different pulse-width modulated power converter applications. For example, in addition to the non-isolated buck regulator applications of FIGS. 3–5 and the secondary regulator applications illustrated in FIGS. 6 and 7, the invention may also be used in a clamped converter application as illustrated in FIG. 8. Referring to FIG. 8, in a clamped converter power converter apparatus 800 according to some embodiments of the invention, a modulator circuit 830 selectively couples a power source 10 to a power transfer network that includes a transformer 810 and a clamping capacitor CC responsive to voltage VCAP on a capacitor CS of a feedback circuit 820. The feedback circuit 820 generates the voltage VCAP responsive to a voltage VOUTSENSE derived from a voltage VOUT at an output port 811a, 811b of the transformer.

The feedback circuit 820 includes a transconductance amplifier 822 that generates a current IC proportional to a difference between the voltage VOUTSENSE and a reference voltage VR1. The current IC charges the capacitor CS to generate the voltage VCAP. The capacitor CS is discharged by a switch SD responsive to a discharge control signal DSCHRG. The feedback circuit 820 also includes a second transconductance amplifier 824 that receives a voltage IOUTSENSE that is representative of an output current derived from the secondary of the transformer 810, e.g., and output current from a rectifier or other circuit connected to the output port 811a, 811b. The second transconductance amplifier 824 generates a current IC' proportional to a difference between the voltage IOUTSENSE and a reference voltage VR3. In particular, the second transconductance amplifier 824 may be configured to reduce the rate of charging of the capacitor CS as the output current increases. Thus, under overcurrent conditions, the second transconductance amplifier 824 can reduce the "on" time of the first switch S1 and increase the "off" time of the second switch S2.

The modulator circuit 830 includes a comparator 832 that generates a control signal used to control first and second switches S1, S2 in a substantially complementary manner responsive to a comparison of the capacitor voltage VCAP and a reference voltage VR2. In particular, the comparator 832 controls the second switch S2 via a first delay 836 and the first switch S1 via an inverter 834 and a second delay 838, with the delays 836, 838 providing a sufficient turn on delay to reduce and/or prevent cross-conduction of the switches S1, S2.

Failures may occur in clamped converters and synchronously rectified outputs of DC to DC converters when either the forward conduction switch (e.g., S1 in FIGS. 3 and 5–8), the freewheeling switch (S2 in FIGS. 3 and 5–7), or the clamp switch (S2 in FIG. 8) remain in either a conducting state or in a non-conducting state for a prolonged period. For example, referring to FIG. 3, leaving S1 "off" while turning S2 "on" for an extended period places the output capacitor C in parallel with the output inductor L for an extended period, which effectively shorts the output of the converter apparatus 300. This can be especially damaging when such a defectively operating converter is connected in parallel with other converters, as the defective converter will also effectively short the outputs of the other converters.

Figure 9:
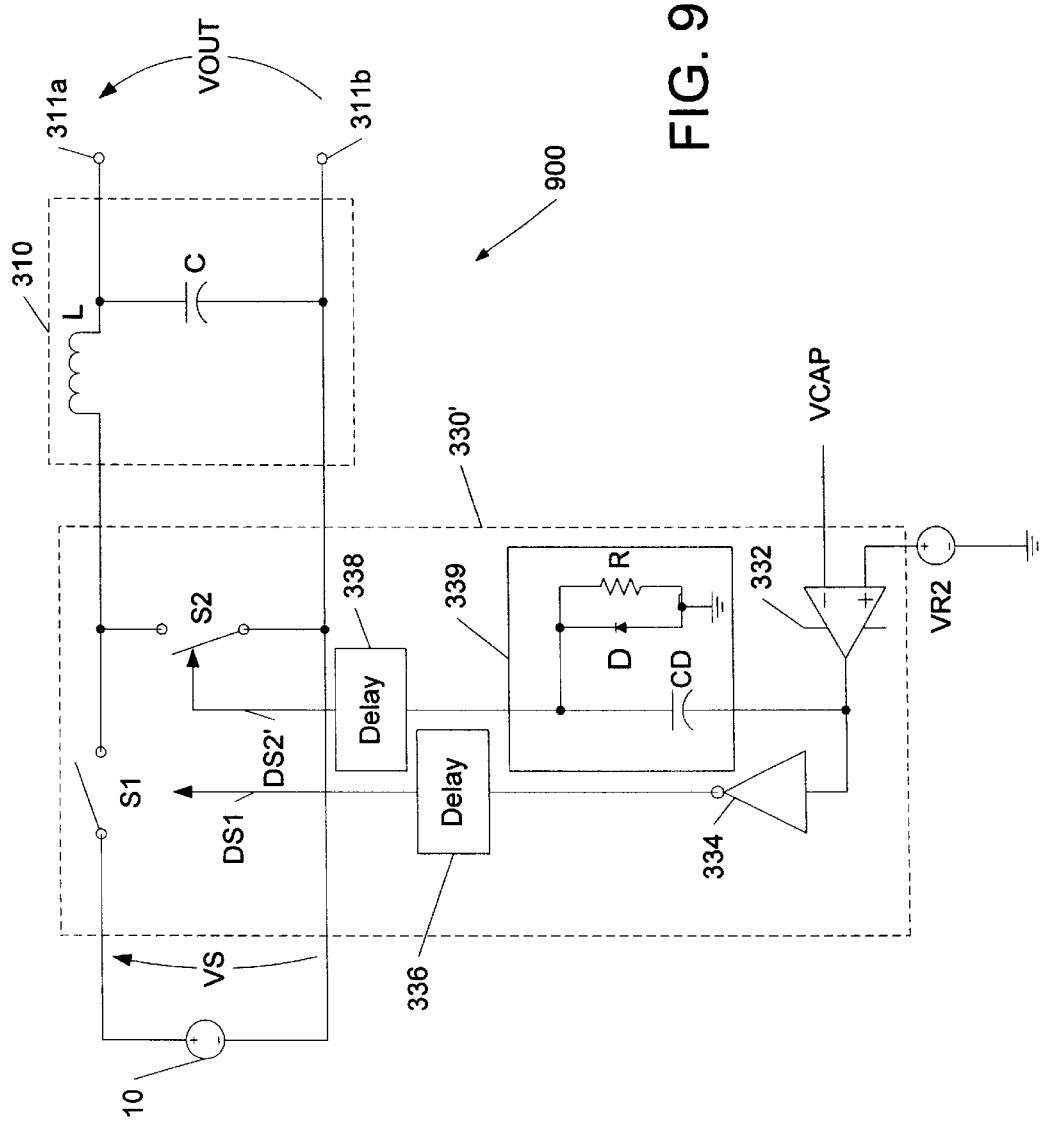
FIG. 9 is a schematic diagram illustrating a monostable drive circuit according to embodiments of the invention.

According to other aspects of the invention, such a problem can be solved using a drive circuit configuration such as that illustrated in FIG. 9. In particular, FIG. 8 illustrates a converter apparatus 900 along the lines of the converter apparatus 300 of FIG. 3, with like components indicated by like reference numerals. The apparatus 900 includes a modulator circuit 330' including a monostable driving circuit 339 for driving the freewheeling switch S2. The monostable driving circuit 339 includes a capacitor CD, a diode D, and a resistor R. The duration of a pulse generated by the driving circuit 339 can be set to be slightly longer than the switching period (e.g., TSW of FIG. 4) of the converter circuit 900. Because the driving circuit 339 is reset each time the drive signal for the freewheeling switch S2 goes "low," the driving circuit 339 generally does not influence the duration of the drive pulse DS2' under normal operating conditions. If the forward conducting switch S1 is turned "off" for an extended time, for example, due to failure of the switch S1 or circuitry that controls switch S1, the signal generated by the comparator 332 will stay "high." However, the monostable driving circuit 339 will generate a single pulse in the drive signal DS2' that is slightly longer than the switch period and then return and remain "low" to turn switch S2 off and prevent extended shorting of the output of the converter apparatus 900. Similar driving circuits can be used with the embodiments of FIGS. 5–8. It will be further appreciated that such monostable driving circuit can be used with other types of PWM converters, including both leading and trailing edge converters.

In the drawings and foregoing description thereof, there have been disclosed typical embodiments of the invention. Terms employed in the description are used in a generic and descriptive sense and not for purposes of limitation, the scope of the invention being set forth in the following claims.

That which is claimed:

1. A power converter apparatus, comprising:
    a transformer having a primary winding and a secondary winding;
    a switching circuit operative to couple and decouple the primary winding of the transformer and a power source;
    a control circuit that controls the switching circuit;
    a power transfer network having an input port and an output port;
    a feedback circuit, coupled to the output port of the power transfer network and to the control circuit, that generates a current responsive to an output voltage at the output port of the power transfer network, that charges a capacitance responsive to the generated current, and that intermittently discharges the capacitance responsive to a control signal generated by the control circuit; and
    a modulator circuit, coupled to the feedback circuit and to the power transfer network, that selectively couples the secondary winding of the transformer to the power transfer network responsive to a voltage on the capacitance.

2. An apparatus according to claim 1, wherein the feedback circuit comprises an amplifier circuit that generates the current responsive to comparison of the output voltage to a reference.

3. An apparatus according to claim 2, wherein the amplifier circuit comprises a transconductance amplifier circuit that generates the current proportional to a difference between a reference voltage and a voltage representative of the output voltage.

4. An apparatus according to claim 1, wherein the feedback circuit is further operative to generate a second current responsive to an output current derived from the output port to charge the capacitance responsive to the second current.

5. An apparatus according to claim 4, wherein the feedback circuit further comprises an amplifier circuit that generates the second current responsive to a comparison of the output current to a reference.

6. An apparatus according to claim 5, wherein the amplifier circuit comprises a transconductance amplifier circuit that generates the second current responsive to a comparison of a voltage representative of the output current to a reference voltage.

7. An apparatus according to claim 1, wherein the switching circuit comprises a first switching circuit, and wherein the modulator circuit comprises:
    a comparator circuit that generates a switch control signal responsive to a comparison of the voltage on the capacitance and a threshold voltage; and
    a second switching circuit that selectively couples the secondary winding to the power transfer network responsive to the switch control signal.

8. An apparatus according to claim 7, wherein the power transfer circuit, the feedback circuit and the modulator circuit form a buck regulator.

9. An apparatus according to claim 7, further comprising a feedforward circuit that generates the threshold voltage responsive to a voltage applied to the primary winding of the transformer.

10. An apparatus according to claim 7, wherein the switch control signal comprises a first switch control signal, and wherein the second switching circuit comprises:
    a first switch that operates responsive to a second switch control signal;

a second switch that operative responsive to a third switch control signal; and a complementary driving circuit that generates the second and third switch control signals responsive to the first switch control signal such that the first and second switches operate in a substantially complementary fashion.

11. An apparatus according to claim 10, wherein the complementary driving circuit includes a monostable driving circuit that generates the third switch control signal.

12. A power converter apparatus, comprising:

a power transfer network;

a transconductance amplifier circuit, coupled to an output port of the power transfer network, that generates a current proportional to a difference between a voltage sense signal representative of an output voltage at the output port and a reference voltage;

a capacitor, coupled to the transconductance amplifier circuit, that charges responsive to the generated current;

a discharge circuit that intermittently discharges the capacitor;

a comparator circuit, coupled to the capacitor, that generates a switch control signal responsive to a comparison of a voltage on the capacitor to a threshold voltage; and a switching circuit, coupled to the comparator, that selectively couples a power source to the power transfer network responsive to the switch control signal.

13. An apparatus according to claim 12, further comprising a second transconductance amplifier circuit, coupled to the output port of the power transfer network, that generates a second current responsive to a comparison of a current sense voltage representative of an output current derived from the output port of the power transfer network to a second reference voltage, and wherein the capacitor is coupled to the second transconductance amplifier circuit and charges responsive to the second current.

14. An apparatus according to claim 12, wherein the power source comprises a secondary winding of a transformer.

15. An apparatus according to claim 14, further comprising a feedforward circuit that generates the threshold voltage responsive to a voltage applied to a primary winding of the transformer.

16. An apparatus according to claim 14, further comprising a second switching circuit that selectively couples a primary winding of the transformer to a voltage source responsive to a second switch control signal, and wherein the discharge circuit intermittently discharges the charged capacitance responsive to the second switch control signal.

17. An apparatus according to claim 12, wherein the switch control signal comprises a first switch control signal, and wherein the switching circuit comprises:

a first switch that operates responsive to a second switch control signal;

a second switch that operates responsive to a third switch control signal; and a complementary driving circuit that generates the second and third switch control signals responsive to the first switch control signal such that the first and second switches operate in a substantially complementary fashion.

18. An apparatus according to claim 17, wherein the complementary driving circuit includes a monostable driving circuit that generates the third switch control signal.

19. An apparatus according to claim 12, wherein the comparator circuit and the switching circuit couple the power circuit to the power transfer network for intermittent intervals that are initiated responsive to a comparison of the voltage on the capacitor to the threshold voltage.

20. An apparatus according to claim 12, wherein the comparator circuit and the switching circuit couple the power circuit to the power transfer network for intermittent intervals that are terminated responsive to a comparison of the voltage on the capacitor to the threshold voltage.

21. A method of operating a power converter apparatus comprising a transformer having primary and second windings, a modulator circuit operative to couple and decouple a power source to and from the primary winding, and a power transfer network configured to be coupled and decoupled to and from the secondary winding, the method comprising:

generating a current responsive to an output voltage at an output port of the power transfer network;

charging a capacitance responsive to the generated current;

generating a control signal from the modulator circuit;

intermittently discharging the capacitance responsive to the control signal; and transferring power from the secondary winding of the transformer to the power transfer network responsive to a voltage on the capacitance.

22. A method according to claim 21, wherein generating a current responsive to an output voltage at an output port comprises generating the current responsive to a comparison of the output voltage to a reference.

23. A method according to claim 22, wherein generating the current responsive to a comparison of the output voltage to a reference comprises generating the current proportional to a difference between a reference voltage and a voltage representative of the output voltage.

24. A method according to claim 21, further comprising generating a second current responsive to an output current derived from the output port to charge the capacitance responsive to the second current.

25. A method according to claim 24, wherein generating a second current responsive to an output current derived from the output port to charge the capacitance responsive to the second current comprises generating the second current responsive to a comparison of the output current to a reference.

26. A method according to claim 25, wherein generating the second responsive to a comparison of the output current to a reference comprises generating the second current responsive to a comparison of a voltage representative of the output current to a reference voltage.

27. A method according to claim 21, wherein transferring power from the secondary winding to the power transfer network responsive to a voltage on the capacitance comprises:

generating a switch control signal responsive to a comparison of the voltage on the capacitance and a threshold voltage; and selectively coupling the power source to the power transfer network responsive to the switch control signal.

28. A method according to claim 27, comprising operating the power transfer circuit as a buck regulator.

29. A method according to claim 27, further comprising generating the threshold voltage responsive to a voltage applied to a primary winding of the transformer.

30. A method according to claim 27, wherein the switch control signal comprises a first switch control signal, and wherein selectively coupling the power source to the power transfer network responsive to the switch control signal further comprises:

operating a first switch responsive to a second switch control signal;

operating a second switch responsive to a third switch control signal; and generating the second and third switch control signals responsive to the first switch control signal such that the first and second switches operate in a substantially complementary fashion.

31. A method according to claim 30, wherein operating a second switch responsive to a third control signal comprises triggering a monostable driving circuit that generates the third switch control signal.

* * * * *

UNITED STATES PATENT AND TRADEMARK OFFICE
CERTIFICATE OF CORRECTION

PATENT NO. : 6,703,817 B2
DATED : March 9, 2004
INVENTOR(S) : Isaac Cohen

It is certified that error appears in the above-identified patent and that said Letters Patent is hereby corrected as shown below:

Column 12,
Line 50, change "the second responsive" to -- the second current responsive --

Signed and Sealed this

Twenty-ninth Day of June, 2004

JON W. DUDAS
*Acting Director of the United States Patent and Trademark Office*